United States Patent [19]

Wuertz

[11] 4,432,465
[45] Feb. 21, 1984

[54] FIRE RATED CLOSURE PLUG

[75] Inventor: Emil S. Wuertz, Madison, Conn.

[73] Assignee: Harvey Hubbell Incorporated, Orange, Conn.

[21] Appl. No.: 429,529

[22] Filed: Sep. 30, 1982

Related U.S. Application Data

[63] Continuation of Ser. No. 309,166, Oct. 6, 1981, abandoned.

[51] Int. Cl.³ .............................................. B65D 53/00
[52] U.S. Cl. .................................... 220/235; 277/26; 174/51; 220/88 A; 52/232; 248/56; 138/89
[58] Field of Search ............. 220/233, 234, 235, 88 R; 277/26; 248/56, 68 CS; 52/232; 174/151; 138/89

[56] References Cited

U.S. PATENT DOCUMENTS

| | | | |
|---|---|---|---|
| 3,720,783 | 3/1973 | Moll | 220/88 |
| 3,911,635 | 10/1975 | Traupe | 220/235 |
| 4,061,344 | 12/1977 | Bradley et al. | 277/26 |
| 4,175,671 | 11/1979 | Holl et al. | 220/235 |

OTHER PUBLICATIONS

One Sheet of Installation Instructions–Square D "Fire Rated Thru–Floor Abandoning Fitting Type G2A-P-TF".

Primary Examiner—G. T. Hall
Attorney, Agent, or Firm—Jerry M. Presson

[57] ABSTRACT

A low heat transfer fitting to close an opening in a fire-rated barrier includes a cover plate, a pressure plate, a radially expandible annular gripping ring between the cover plate and the pressure plate, and adjustable fasteners between the two plates to urge them toward each other to expand the ring. A body of intumescent material is supported in the opening by the pressure plate with a low heat transfer member. Two embodiments are disclosed.

11 Claims, 6 Drawing Figures

FIRE RATED CLOSURE PLUG

This is a continuation of application Ser. No. 309,166, filed Oct. 6, 1981 now abandoned.

This invention relates to a low heat transfer fitting for an opening through a fire-rated barrier such as a concrete floor or the like wherein the thickness of the fitting is adjustable to match the barrier thickness.

BACKGROUND OF THE INVENTION

It is common practice in building construction to provide electrical, telephone, plumbing and other service openings through barriers such as concrete floors at the time a building is constructed and finished. While some of those openings may be used initially, others are reserved for future use. The barriers, being poured or cast concrete or the like, represent good fire barriers. Thus, openings cast or drilled therethrough can reduce the integrity of the barriers and present potential fire and heat passageways. Clearly, it is important to provide a closure fitting for each such opening to thereby restore the integrity of the barrier.

One such fitting is shown in U.S. Pat. No. 4,061,344, issued Dec. 6, 1977, to Bradley et al. That fitting includes layers of elastomeric materials and intumescent materials and includes clamping bolts extending through the fitting between end plates which may also be coated with intumescent material. A disadvantage of this structure is the direct heat path through the fitting by way of the clamping bolts, which, to some degree, reduces the effectiveness of the plug and of the intumescent material therein.

BRIEF DESCRIPTION OF THE INVENTION

Accordingly, an object of the present invention is to provide a fire-rated closure fitting which is easily adjustable to accomodate barriers of various thicknesses and which minimizes heat flow therethrough.

A further object is to provide such a fitting which can be firmly fixed in a barrier and incorporates intumescent material to inhibit heat, smoke and flame passage.

Another object is to provide such a plug which is simple in construction and easy to install and remove.

Briefly described, the invention includes a closure fitting for installation in a generally circular opening in a fire-rated barrier to maintain the integrity of the barrier comprising the combination of a cover plate dimensioned to cover and extend beyond the periphery of the opening on one side thereof and to lie adjacent one surface of the barrier, generally annular gripping ring means of compressible elastomeric material for fixing the position of the fitting in the opening, said ring means having an outer diameter approximating the diameter of the opening, and having an axial thickness significantly less than that of the barrier, one face of said ring means being adjacent a surface of the cover plate, a generally circular pressure plate adjacent the opposite face of said ring means, and having a diameter smaller than the outer diameter of the ring, means extending between said cover plate and said pressure plate for urging said plates toward each other to axially compress and radially expand said ring means against the opening, a body of intumescent material, and means for supporting the body of intumescent material in generally parallel adjustably spaced relationship with the pressure plate.

In order that the manner in which the foregoing and other objects are attained in accordance with the invention can be understood in detail, particularly advantageous embodiments thereof will be described with reference to the accompanying drawings, which form a part of this specification, and wherein.

Figure 1:
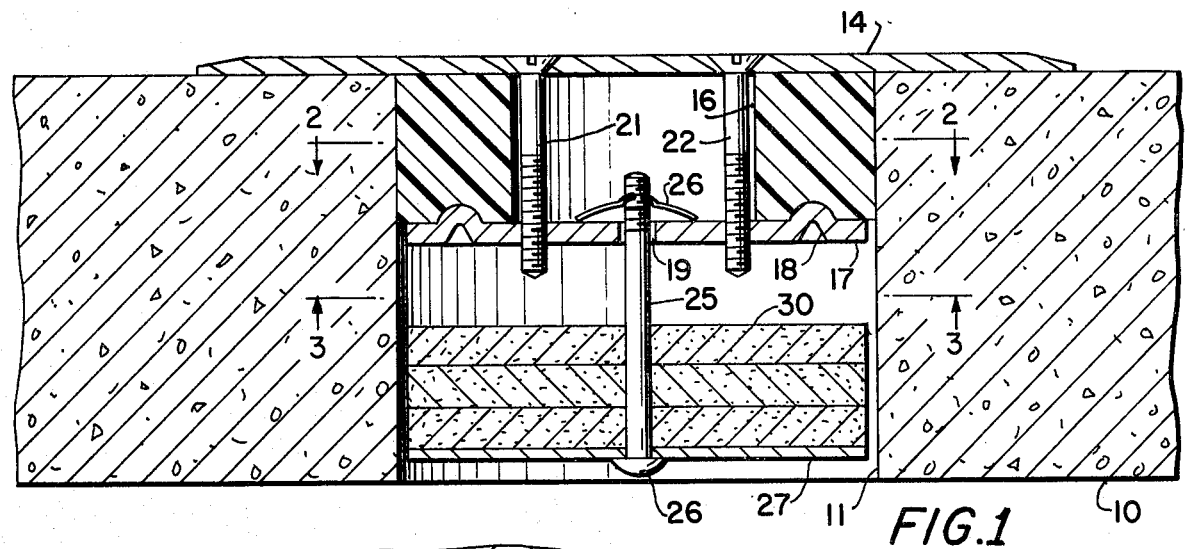
FIG. 1 is a partial side elevation, in section, of a barrier having an opening therethrough and including a first embodiment of a fitting in accordance with the present invention.

FIG. 1 shows a partial side elevation, in section, of a floor 10 which, in its simplest form, constitutes a slab of poured or cast concrete. A generally circular opening 11 has been cast into the slab, or cut through the slab after casting, to permit the passage of electrical cables, pipes, or other devices at some future time. Until such time as the opening is to be used, it is closed by an apparatus in accordance with the invention which includes a cover plate 14 which can be generally circular in shape and which has a diameter significantly greater than the diameter of opening 11 so that the peripheral portions thereof lie on the upper surface of slab 10 around the opening. Plate 14 would commonly be about 6.125 inches in diameter for a three inch opening 11 and about 0.1 inches thick, such plates commonly being zinc plated steel or stainless steel, or aluminum.

The apparatus further includes an annular ring 16 having a generally flat upper surface which abuts the bottom surface of plate 14. Ring 16 is made of a compressible, elastomeric material such as rubber, neoprene or any of a wide variety of elastomers which are compressible and resilient and relatively stiff. The outer diameter of ring 16 is chosen to be about the same diameter as, or slightly smaller than, the inner diameter of opening 11.

Below ring 16 is a pressure plate 17 which is a relatively stiff plate, preferably zinc-plated steel, and is generally circular. An annular identation 18 in the bottom of plate 17 causes an annular rib to protrude upwardly into ring 16 to fix the relative positions thereof.

Figure 2:
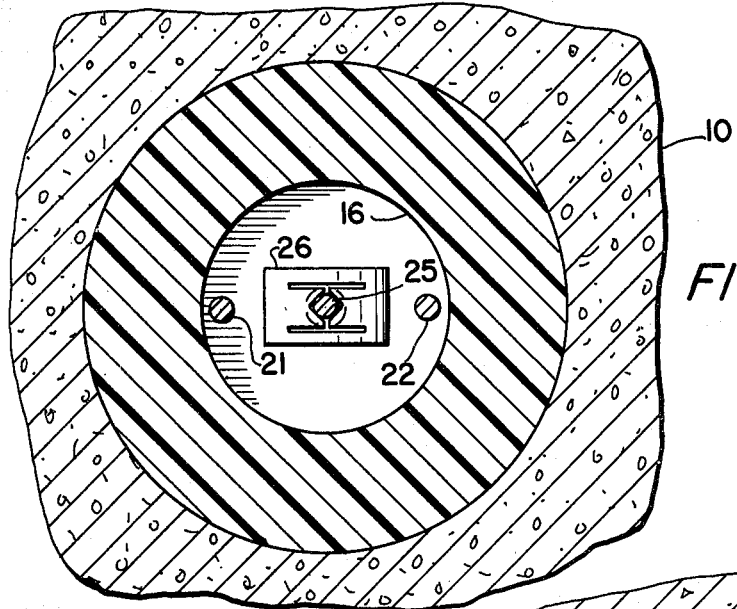
FIG. 2 is a transverse sectional view along line 2—2 of FIG. 1.
Figure 3:
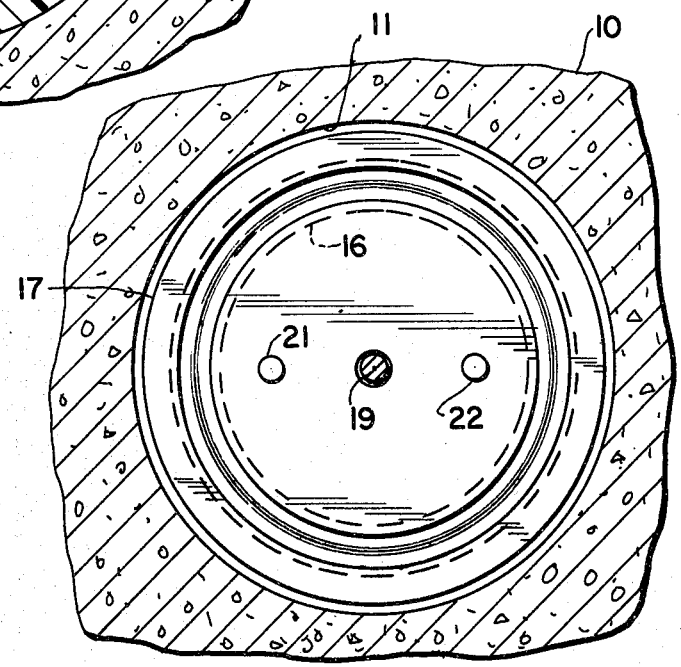
FIG. 3 is a transverse sectional view along line 3—3 of FIG. 1.

Plate 17 is provided with a central opening 19 and internally threaded openings, spaced outwardly from opening 19 along a diameter of plate 17, to receive threaded end portions of two flat-head machine screws 21 and 22. Screws 21 and 22 pass through openings in plate 14, which are preferably countersunk to receive the heads thereof so that the upper surface of plate 14 remains substantially flat. As will be recognized, rotation of screws 21 and 22 will cause plate 17 to be moved axially toward plate 14, compressing ring 16 therebetween and causing the ring to expand radially outwardly. Thus, after installation of the device in opening 11, compression of the ring causes it to engage the inner walls of the opening and keep the device in place. When it is desired to remove the apparatus shown in FIGS. 1-3, screws 21 and 22 need only be rotated in the reverse direction, permitting the ring to relax so that the device can be removed from the opening.

The central hole in plate 17 receives a bolt-like member 25 the upper end of which is threaded to engage a member 26 which can be a Tinnerman nut, as illustrated, or any other form of internally threaded nut member. The lower end of bolt 25 has an enlarged head 26 which engages the under surface of a support plate 27. Plate 27 is preferably circular and has a central opening for bolt 25, and also supports a body of intumescent material 30 which can be, as illustrated, a series of disc-like intumescent bodies stacked on plate 27 and provided with central openings to permit passage of bolt 25.

As will be recognized, hole 19 in plate 17 is significantly larger than bolt 25, this being intentional to minimize contact between the two bodies and, thereby, to minimize heat transfer therebetween. Additionally, the use of a Tinnerman nut as the threaded member 26 is advantageous because this form of nut has a relatively small mass and small contact area with bolt 25 as well as with the upper surface of plate 17, again minimizing heat conduction between those elements.

It will further be observed that the only direct path for heat conduction, by metallic components, through the apparatus illustrated is through the path including bolt 25, nut 26, plate 17 and machine screws 21 and 22. Having reduced the thermally conductive characteristics of this path as shown and described, the plug apparatus of the present invention is characterized by very low heat conduction from one side of the barrier to the other.

As will further be recognized, the body of intumescent material 30 is normally loosely received in opening 11 and will remain so unless subjected to temperatures characteristic of a conflagration at the lower side of barrier 10, whereupon the intumescent material will expand to fill the opening and prevent the passage of flame or heat therethrough. This characteristic of such material is well known and many such materials are available for this purpose.

The apparatus is further characterized by adjustability in that the bolt 25 can be rotated relative to the Tinnerman nut to establish a parallel spaced relationship between plates 17 and 27 so that the entire apparatus substantially fills the opening, plate 27 being close to the lower surface of barrier 10, and the body of intumescent material being also spaced from plate 17. While this relationship is not critical, it is advantageous to maintain a spacing between plate 17 and the body of intumescent material so that the material can further expand to fill that space without overflowing below the barrier. When such expansion occurs, the thermal barrier thus formed prevents combustible floor materials which might exist above plate 14 from being affected by the heat for an extended period of time.

Figure 4:
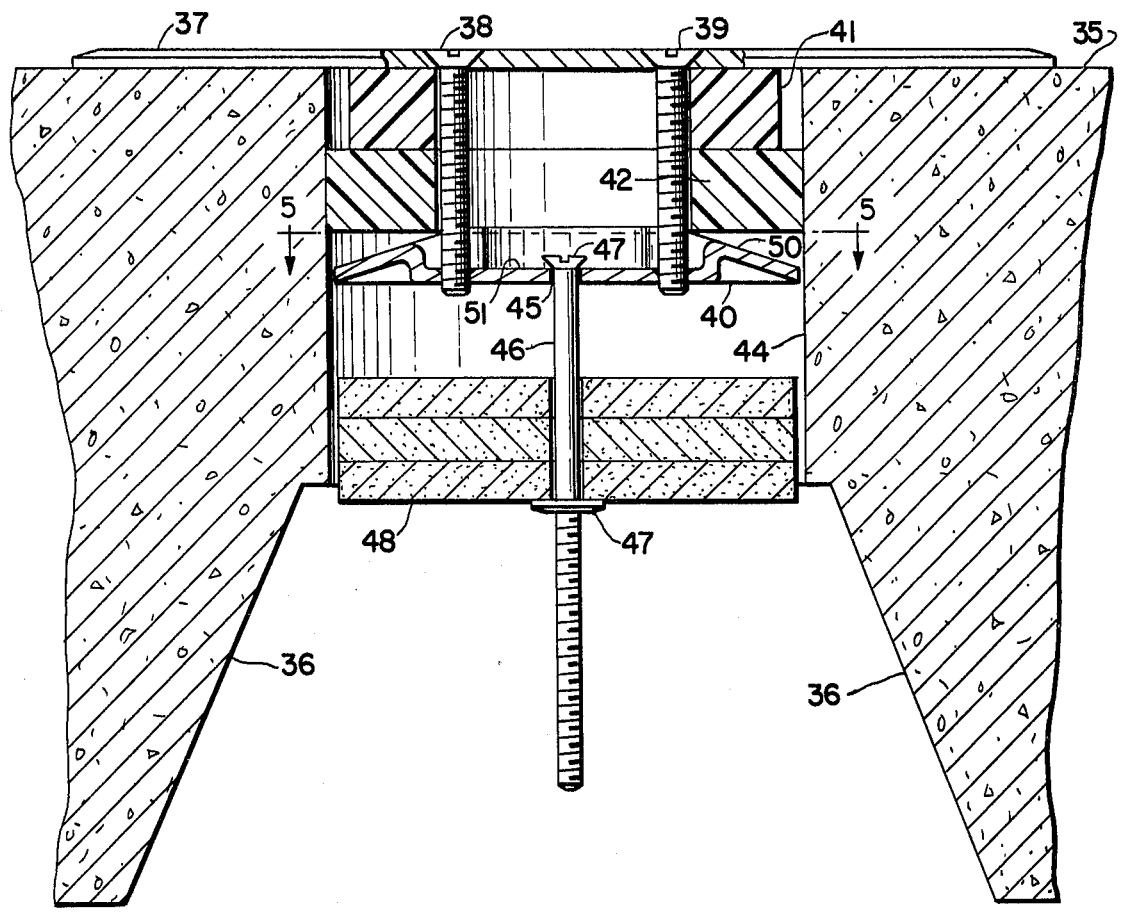
FIG. 4 is a side elevation of a second embodiment of a fitting in accordance with the present invention.
Figure 5:
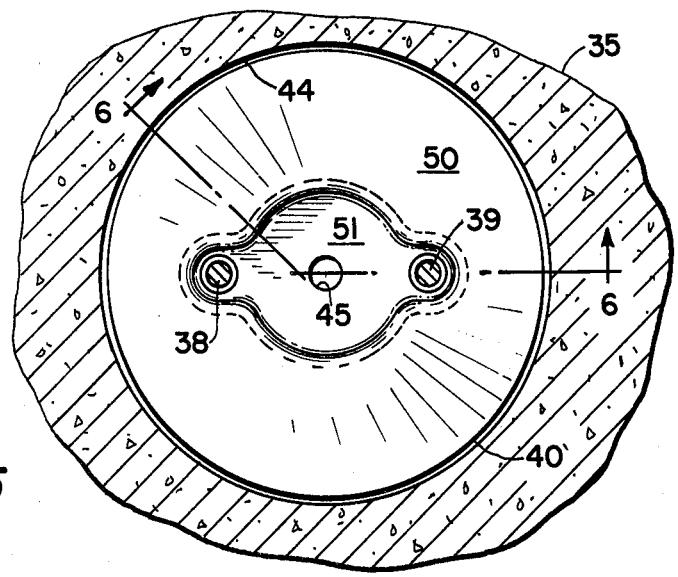
FIG. 5 is a sectional plan view along line 5—5 of FIG. 4.
Figure 6:
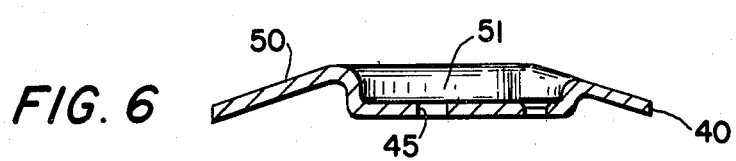
FIG. 6 is a partial sectional view along line 6—6 of FIG. 5.

FIGS. 4-6 illustrate a second embodiment of an apparatus in accordance with the invention, this embodiment being shown in the context of a barrier such as a steel-reinforced deck floor 35 formed with longitudinally extending, integrally formed ribs 36, although the device can certainly be used in other forms of barriers. The device includes a cover plate 37 having chamfered openings to receive mounting screws 38 and 39 so that the heads thereof are flush with the upper surface of the mounting plate. Screws 38 and 39 are externally threaded and engage threaded openings in a pressure plate 40. The screws pass through the central openings in two annular elastomeric rings 41 and 42 which form ring means for fixing the position of the fitting in an opening 44 in the barrier. As will be seen, the outer diameter of ring 41 is significantly less than the diameter of opening 44, while ring 42 is, in its relaxed position, substantially equal to the opening diameter. Support plate 40 has a central opening to receive a bolt 46 which passes through the plate and extends downwardly therefrom. At least a portion of bolt 46 is threaded to receive a nut-like internally threaded body 47 which supports an intumescent body 48 consisting, in this case, of three substantially rigid disks of intumescent material. Bolt 46 has an enlarged head 47 which rests on plate 40, the contact between the chamfered head 47 and the opening in plate 40 being essentially line contact having low thermal conductivity properties. Thus, thermal conduction between bolt 46 to plate 40 is relatively small.

As will be seen in FIG. 4, pressure plate 40 has a generally frustoconical upper surface 50 and has a central depression 51 which is generally circular but has outwardly extending end portions with threaded openings therein to receive bolts 38 and 39. Also seen in FIGS. 5 and 6 is central opening 45 to receive bolt 46. As will be seen by comparing FIGS. 4 and 6, the frustoconical surface 50 slopes downwardly and outwardly away from ring 42, and the upper portion of the cone of surface 50 is smaller in diameter than the central opening in ring 42. Thus, as threaded fasteners 38 and 39 are tightened, drawing pressure plate 40 upwardly, the sloping surface 50 compresses rings 42 and 41 but, additionally, provides a radial outward force on ring 42 which considerably enhances the gripping force which tends to press against and frictionally engage the wall of opening 44. Rings 41 and 42 are preferably made of a material such as neoprene having a durometer hardness of between about 35 and about 45.

A significant advantage is provided by making the outer diameter of ring 41 somewhat smaller than that of ring 42, the advantage being that the smaller ring 41 contributes to the resultant forces tending to radially expand ring 42 to engage ring 42 in opening 44. It has been found that by making ring 41 smaller as shown, considerably less torque on screw 38 and 39 is necessary to squeeze ring 42 between ring 41 and plate 40 and to cause enough outward expansion of ring 42 to firmly fix the structure in place. With relatively little upward movement of pressure plate 40, sufficient expansion of ring 42 results so that the device is firmly attached within opening 44. The height of the disks forming intumescent body 48 and the spacing from the lower surface of pressure plate 40 is selectable by adjustment of nut 47 on bolt 46 and is arranged so that the lower portion of the intumescent body is at the same level as, or slightly below, the lower exposed surface of the barrier through which the opening extends.

While certain advantageous embodiments have been chosen to illustrate the invention it will be understood by those skilled in the art that various changes and modifications can be made therein with out departing from the scope of the invention as defined in the appended claims.

What is claimed is:

1. A closure fitting for installation in a generally circular opening in a fire rated barrier to maintain the integrity of the barrier comprising the combination of
a cover plate dimensioned to cover and extend beyond the periphery of the opening and lie adjacent one surface of the barrier;
generally annular gripping ring means having a continuous circular peripheral surface of compressible elastomeric material for fixing the position of the fitting in the opening, said ring means having an outer diameter equal to or less than that of the opening and having an axial thickness significantly less than that of the barrier, one face of said ring means being adjacent a surface of said cover plate;

a generally circular pressure plate adjacent the opposite face of said ring means and having a diameter smaller than said opening;

means extending between said cover plate and said pressure plate for urging said plates toward each other to axially compress and radially expand said ring means against the opening;

a body of intumescent material having a diameter normally smaller than said opening; and means for supporting said body of intumescent material in generally parallel relationship with said pressure plate, said means for supporting said body of intumescent material being adjustable relative to said pressure plate, whereby said body of intumescent material is positionable adjacent an opposite surface of the barrier.

2. An apparatus according to claim 1 wherein said body of intumescent material is spaced from said pressure plate.

3. An apparatus according to claim 1 wherein said means extending between said cover and support plates comprises two fastener members extending through said cover plate and threadedly engaging said pressure plate.

4. An apparatus according to claim 3 wherein said means for supporting includes
a support plate in spaced relationship with said pressure plate;
means defining a hole through said pressure plate;
an externally threaded member engaging said support plate and having one end extending through said hole in said pressure plate; and
an internally threaded member engaging said end of said externally threaded member and resting on said pressure plate.

5. An apparatus according to claim 1 wherein said means for supporting includes
a support plate in spaced relationship with said pressure plate;
means defining a hole through said pressure plate;
an externally threaded member engaging said support plate and having one end extending through said hole in said pressure plate; and
an internally threaded member engaging said end of said externally threaded member and resting on said pressure plate.

6. An apparatus according to claim 1 wherein said body of intumescent material comprises a plurality of disks of intumescent material having diameters smaller than the opening.

7. An apparatus according to claim 1 wherein said pressure plate comprises a generally circular body having a generally frustoconical upper surface for contacting said ring means, said surface sloping outwardly and away from said ring means.

8. An apparatus according to claim 7 wherein said ring means includes
a first elastomeric annular body adjacent said cover plate, said first body having an outer diameter significantly smaller than the opening in the barrier; and
a second annular elastomeric body between said first body and said pressure plate, said second body having an outer diameter greater than that of said first body.

9. An apparatus according to claim 1 wherein said body of intumescent material comprises a plurality of substantially rigid disks of intumescent material forming a stack, said disks having aligned central openings.

10. An apparatus according to claim 9 wherein said pressure plate includes means defining a central opening therein; and said means for supporting includes
a bolt having a threaded shaft and an enlarged head, said bolt extending through said central opening in said support plate and said disks with the head thereof resting on said support plate; and
an internally threaded member threadedly engaging the bolt shaft and supporting said disks.

11. A closure fitting for installation in a generally circular opening extending substantially vertically through a barrier having respective upper and lower surfaces to maintain the integrity of the barrier comprising the combination of:
a substantially horizontally disposed cover plate dimensioned to cover an upper end of the opening and lie adjacent the upper surface of the barrier;
a member having a generally cylindrical portion of compressible material for abutting the wall defining the opening, said portion having an outer diameter equal to or less than that of the wall surface of the opening when in an uncompressed state and having an axial thickness less than that of the barrier, said portion located closer to said upper surface than to said lower surface of said barrier;
means extending from said cover plate into the opening and through said portion of said member for axially compressing and radially expanding said portion of said member against the wall of the opening upon actuation thereof;
at least one element of intumescent material having a diameter normally smaller than the wall of the opening, said element located adjacent said lower surface of the barrier; and
adjustable means coupling the intumescent element to said cover plate for adjustably positioning said element relative to said lower surface of said barrier.

* * * * *